March 28, 1961  M. A. MOSKOVITZ ET AL  2,977,131
BALL JOINT CONNECTING MEANS
Original Filed Feb. 8, 1954
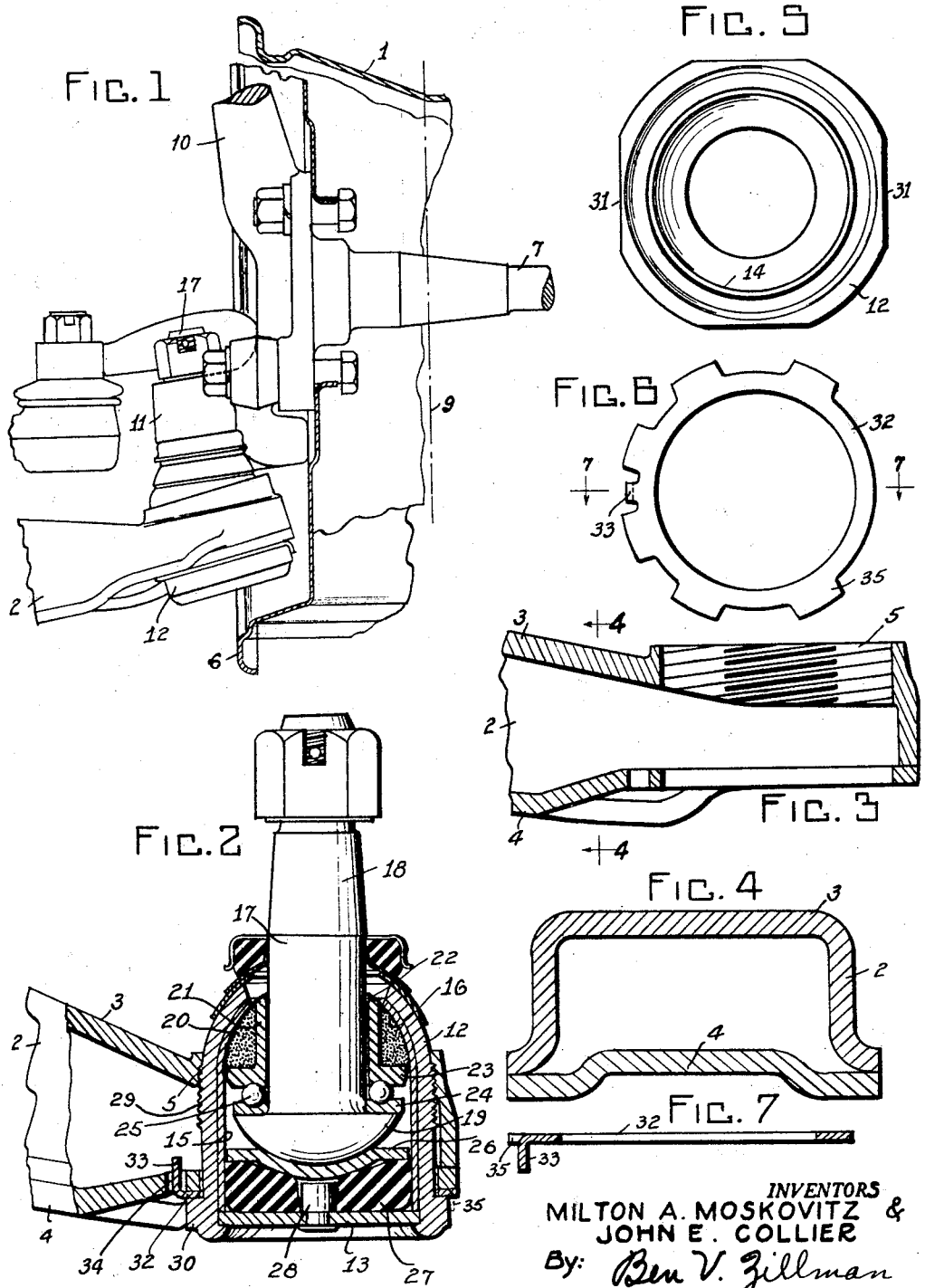
INVENTORS
MILTON A. MOSKOVITZ &
JOHN E. COLLIER
By: Ben V. Zillman
ATTORNEY

United States Patent Office 2,977,131
Patented Mar. 28, 1961

2,977,131
BALL JOINT CONNECTING MEANS

Milton A. Moskovitz, Richmond Heights, Mo., and John E. Collier, Highland Park, Mich.; said Collier assignor to Chrysler Corporation, Highland Park, Mich., a corporation of Delaware, and said Moskovitz assignor of one-half to Harry Frankel, St. Louis, Mo.

Continuation of application Ser. No. 408,777, Feb. 8, 1954. This application Aug. 21, 1957, Ser. No. 679,805

13 Claims. (Cl. 280—96.2)

This application is a continuation of our United States patent application Serial No. 408,777, filed February 8, 1954, now abandoned.

This invention relates to wheel suspension means generally, but more particularly to ball joint devices that are connected between each of the upper and lower control arms of a motor vehicle and the front wheel most closely adjacent thereto, so that the movement of the wheels will be about such ball joints, regardless of whether the wheels move up or down, or to the right or the left during the travel of the vehicle.

One of the principal objects of our invention is to so construct such a ball and socket joint assembly that it is a completely assembled sealed unit prior to installation, and may be mounted in place on said control arm or attaching arm without disturbing the parts of said unit.

Another object of the invention is to so construct such an assembly unit, so that the ball-ended or stud element of the same is initially properly "loaded" with the yieldable pressure means of the same resisting movement of the stud axially in one direction, and to insure that all of said units that are installed on the same vehicle are initially of substantially equal loading, and which will make for easier steering and control of the vehicle during driving of the same.

An added object of our invention is to provide a construction that enables not only the rapid and simple mounting of said unit devices into place, but which will permit just as ready and quick removal of the same from the vehicle whenever a replacement of the unit is indicated, all of this being accomplished while retaining the unit sealed and without danger that any of its component parts may be lost or displaced during such mounting or dismounting.

A further object of the invention is to so construct the joint unit and the end of the control arm to which the same is intended to be mounted, whereby such mounting and dismounting may be had without in any way bending, springing, breaking or otherwise damaging said arm or rendering it useless, such a construction permitting innumerable such replacements during the life of the vehicle and while retaining the original control arm.

A still further object of our invention is to so construct said unit with a minimum overall diameter or thickness without any sacrifice of its strength or durability, and whereby said unit may be positioned as closely as possible to the center line of the adjacent wheel, to thereby minimize the amplitude of weaving or sidewise wobble of said wheel as the latter travels along the roadway. Therefore, such a construction not only results in a slower tire wear, but it makes for much smoother riding and easier steering of the vehicle.

Yet another object of the invention is the construction of a ball and socket joint of the kind described, wherein there is a relatively soft or weak bushing interposed between the relatively movable stud and socket elements of the joint, such a bushing being admirably suited for its purpose, and there is a stronger element acting as a reinforcement between said bushing and stud to prevent crushing or chipping of said bushing during service, said reinforcement means having a portion of substantially the same curvature as that of the bearing surface of the socket to bear on the latter during angular displacement of the stud relatively of its socket.

In addition, said reinforcing means is made of sufficiently smaller diameter than the rounded bearing surface of said bushing so as not to bind against the socket bearing surface and impair the full tilt of the stud and bushing, and in addition, has a portion of larger diameter than the open end of the socket so that if there should be a crushing, fracture or other failure of the bushing in service, said reinforcement element will be moved axially a predetermined distance to be stopped by bodily engaging the rounded bearing surface of said socket.

Many other objects and advantages of the construction herein described will be obvious to those skilled in the art to which this invention appertains, as will be more clearly pointed out in the disclosures hereinafter set forth.

To this end, our invention consists in the novel construction, arrangement and combination of parts herein shown and described, and as will be readily understood and clearly set out in the following specification.

In the drawings, wherein like reference numerals represent like or corresponding parts.

Figure 1 is a fragmentary elevational view showing the relationship of the joint unit to one of the control arms and the adjacent front wheel rim of the vehicle, with a portion being indicated in cross section;

Figure 2 is a cross-sectional view through the joint unit, with certain parts in elevation, and showing the manner of securement to the end of one of the control arms;

Figure 3 is a fragmentary detail of the end of the control arm;

Figure 4 is a cross-sectional view, taken substantially along the line 4—4 of Fig. 3;

Figure 5 is an end view of the socket element of the joint, as viewed from the larger end of the bore therethrough, and as it looks prior to its being peened over the end closure of the socket;

Figure 6 is a plan view of the washer element; and

Figure 7 is a cross-sectional view of said washer element, taken substantially along the line 7—7 of Fig. 6.

Referring more particularly to the drawing, wherein we have illustrated a preferred embodiment of our invention, there is represented in Fig. 1, a fragment of the suspension mechanism for the rim 1 of one of the front wheels of the vehicle, there being a pair of upper and lower such arms for each front wheel, and the lower one of said arms being indicated at 2 and shown as being hollow with a pair of spaced apart opposed plates 3 and 4 and having an eye or bore through an end thereof. One of said plates preferably has its eye-forming portion provided with internal screw threads 5 for a purpose being hereinafter set forth. 6 indicates the housing or casing for the brake of the wheel shown, 7 indicating the spindle upon which the front wheel rim is mounted, the center or median line of the wheel and tire (not shown) being indicated at 9.

A bracket is fixed to said spindle and has upper and lower ends 10 and 11, said lower end being connected to the adjacent end of said lower control arm by a ball and a socket joint, it being understood, of course, that the upper end of said bracket may have a similar connection to the adjacent end of the upper control arm, so that only the lower unit will be described.

All movement of the front wheels will be about these ball joints, no matter whether the wheels travel up or down as the wheels travel along the road, or whether the vehicle is steered to the right or to the left.

A shell or socket element 12 has a bore or opening axially therethrough, with the uppermost end of said opening preferably reduced in diameter. The other end of said opening is adapted to have a closure element 13 extended thereacross and locked in place in any preferred manner, as by peening the socket element onto said closure element, Fig. 5 indicating the initial appearance of the flange 14 which is to be peened, while Fig. 2 shows the peening completed.

A rounded bearing surface is provided at the upper end of said opening of the socket element and may be either integral therewith, or as shown it may be a separate element or sleeve 15 having the segmentally spherical or concave bearing surface 16, the sleeve being of any suitably sturdy material.

A stud element 17 comprises the other one of the pair of relatively movable members of the ball and socket joint structure, and has a longitudinally extending shank 18 that projects through the open upper end of the socket when in assembled relation, and said shank is adapted to be removably received in the bracket, there being a nut for removably securing said stud to said bracket.

The lower end of said stud is provided with a radially enlarged head which is rounded or segmentally spherical at its under surface to provide the convex bearing surface 19 having substantially the same curvature as that of the bearing surface 16 so as to be complemental and concentric with the latter and so that bearing surface 19 will engage the bearing surface 16 after a predetermined degree of angular tilt of the stud relative to the socket.

A bushing element 20 is interposed in the opening, between the stud and said bearing surface 16, and is in the form of an annulus to receive the stud shank therethrough, the convex exterior of said bushing being shaped to be complemental to said concave bearing surface 16.

Although this bushing may be of any suitable material, we prefer that it be made of a relatively soft or weak substance, such as out of sintered metal, so that it will efficiently retain lubricant throughout its body and serve to minimize the rapidity of the wear between itself and the bearing surface 16.

However, there is a possibility that such a bushing may crush, chip, fracture, or otherwise become damaged, especially under excessive shock conditions of the joint, and we therefore prefer to properly reinforce the same against such accidental damage, by interposing a sleeve element 21 between it and the stud shank, the upper end of said sleeve having a convexedly rounder surface 22 of substantially the same curvature as that of the convex exterior of the bearing surface of the bushing and the bearing surface 16, so that when the stud is tilted angularly, a portion of said rounded portion 22 will engage the bearing surface 16 to take up a portion of the load transmitted between the stud and the bearing 16.

The lower end of the sleeve is extended radially to provide the flange 23 terminating slightly from the adjacent bearing surface of the socket and forming one of the pair of raceways shown, the other raceway 24 being spaced axially from said raceway 23 to engage the flat face of the stud head, and there being bearing balls 25 rolling between said pair of raceways. If, for any reason, there should be a failure of the bushing, the flange 23 could shift axially in the socket to come to a stop upon engagement with the reduced portion of the bearing surface 16, and act as a safety to prevent the separation of the stud from the socket.

Suitable means may be provided for resiliently maintaining all of said parts in proper assembly and bearing relation, and in this instance includes a pressure plate 26 movable axially within said socket and limited in its lateral movement by the bounding side wall of the bearing sleeve, a lubricant chamber being formed between said plate and the adjacent bearing surface of said stud head and the bounding wall within said socket.

This plate may have its central portion concave to receive and rotatably seat the cooperating spherically rounded head of the stud to permit rotating and tilting of the latter during operation, and is movable axially within said chamber.

Any suitable source of yieldably resilient pressure may be interposed in the socket between said plate and the closure element, as for example the plug 27 made of a natural or synthetic rubber-like material, and preferably initially in the form of the frustum of a cone so that when compressed to assembled position within the joint unit, it will press radially outwardly against the bounding wall of the lubricant chamber to prevent leakage therepast, said pressure however, not being great enough to destroy the desired resiliency after the plug has been locked into place. Thus, this plug will provide the requisite lateral and axial pressure and be sufficiently axially compressible to resiliently absorb and dampen the shocks to which the joint will be subjected in service. A pin 28 of relatively incompressible material may be placed between the closure element and the pressure plate to limit the compression of said plug to a predetermined degree.

Such an assembled joint unit, with the cover or closure in place, will be "loaded" to the proper amount, with the plug exerting a constant axial thrust on the stud and tending to maintain the movable parts of the unit in their operative desired bearing relationship.

In order to quickly and readily attach said joint unit into position in the wheel suspension mechanism, or to remove it therefrom, we prefer to form screw threads 29 on a portion of the exterior peripheral surface of the socket element, so that said unit may be inserted, completely assembled and sealed, through the eye or opening in the end of the control arm, said screw threads cooperating with the mating screw threads 5 of the eye opening, there being a radially extending flange 30 at the larger end of the socket bore and which will move toward the plate 4 of the control arm as the unit is tightened into operative position on the latter.

In order to prevent rotational movement between the joint and arm after assembly, one or more "flats" 31 may be provided in circumferentially spaced relation about the flange 30, and a washer 32 may be removably interposed between said flange and control arm to detachably keep said members interlocked. Said washer may be flat and have an ear 33 extending at an angle therefrom for insertion into an opening 34 through the adjacent portion of the plate 4 of the control arm, as shown most clearly in Fig. 2, and there are a plurality of outwardly projecting ears 35 spaced circumferentially about the rim of the washer so that after the socket has been threadedly interlocked sufficiently to jam the washer between said flange and the adjacent face of the plate 4, one or more of the ears 35 may be bent in a direction opposite to that of the ear 33 to lie flat against said "flats," as indicated in dotted lines in Fig. 2. Thus, the washer removably interlocks the joint unit against rotational displacement relatively of said control arm.

It is to be especially noted that insertion of the joint unit is done easily and quickly without disturbing the initial shape or form of the control arm, and whenever it becomes necessary, for any reason, to replace said joint unit with another, all that need be done is to remove the end nut that secures the stud to the bracket, bend back or cut off the ear 35 of this washer, and then simply unscrew the sealed unit from the control arm. As there is no springing, bending, or other deformation of the control arm, there is no possibility of damaging or breaking any portion of this relatively expensive member, and such replacements may be repeated as often as necessary, without danger of arm breakage, during the life of the vehicle.

Further, inasmuch as the joint unit is kept intact and sealed at all times, there is no likelihood that any of its parts will drop out or otherwise become lost or displaced during the mounting or dismounting operations, and in all, the job may be accomplished in a minimum of time and with least possible labor.

It is to be especially noted that the ball joint is placed as close to the center line 9 of the wheel as is possible to thereby minimize the degree and intensity of lateral shifting and wobbling of the wheel as the latter travels along the roadway, the overall diameter or width of the socket being kept to a minimum without sacrificing any of the strength needed, and the eye portion of the control arm and a portion of the joint unit actually extends within the wheel rim itself.

We claim:

1. A ball and socket cartridge unit for connecting two eye equipped members which comprises a metal casing with an externally threaded side wall and a fragmental spherical end portion converging from the side wall to a reduced diameter opening, a wrench engaging head on the other end of the casing, said spherical end portion of the casing fitting freely through an eye of one member, said head end of the casing being too large to fit through said eye and said threads on the side wall of the casing engaging said eye in threaded relation, a ball stud assembly tiltable and rotatable in said casing and including a shank projecting freely through the opening of the casing, said shank having a tapered wedge portion adapted to wedge fit into an eye of the other member and having a threaded end portion for receiving a nut to bottom on said other member for locking the shank to said other member, and said other member being too large to fit through said eye of said one member, whereby said unit connects the members in tiltable and rotatable relation and coacts therewith to prevent dropping out or being pulled through the eye of the first member.

2. A ball and socket cartridge unit for connecting two eye equipped members which comprises a metal casing with an externally threaded side wall and a fragmental spherical end portion converging from the side wall to a reduced diameter opening, a wrench engaging head on the other end of the casing, said spherical end portion of the casing fitting freely through an eye of one member, said head end of the casing being too large to fit through said eye and said threads on the side wall of the casing engaging said eye in threaded relation, a ball stud assembly tiltable and rotatable in said casing and including a shank projecting freely through the opening of the casing, said shank having a portion adapted to fit into an eye of the other member and having a threaded end portion for receiving a nut for locking the shank to said other member, whereby said unit connects the members in tiltable and rotatable relation.

3. In combination with a pair of eye equipped members, a preassembled ball and socket cartridge unit interconnecting said members and comprising a hollow metal casing and a ball stud assembly tiltable and rotatable in said casing; said casing including a side wall threadedly engaging the eye of one of said members, an end wall connected to said side wall, an end portion converging from the side wall to a reduced-size opening, an enlarged head portion on the other end of the casing and larger in size than the eye in said one member, and a wrench receiving portion to facilitate the threading of said casing into the eye of said one member; said ball stud assembly including a shank projecting freely through the reduced-size opening in said end portion and insertable in the eye of the other one of said members while said end wall is connected to said side wall and while said cartridge unit is in an assembled state, and means for detachably securing said shank in said eye in said other member for ready connection to and removal from said eye while said end wall is connected to said side wall and while said cartridge unit is in an assembled state.

4. In a vehicle, first and second eye-equipped members, and a preassembled ball and socket cartridge unit for interconnecting said members comprising a hollow casing and a ball stud assembly; said casing having a wrench engaging head portion at one end thereof too large to fit through the eye in said one member, an externally threaded central portion threadable in the eye in said first member, and a portion at the other end thereof the exterior of which converges from the size of said central portion to a smaller size at the end of said casing most remote from said one end, said one end of said casing serving to prevent said cartridge unit from being pulled through the eye of said first member, said other end of said casing fitting through the eye in said one member during the assembly of said preassembled cartridge unit to said first member and extending beyond the eye and on the opposite side of said first member from said one end of said casing when said cartridge unit is assembled to said first member, said hollow casing having an opening through said other end and having an interior surface which converges towards and to said opening; said ball stud assembly being tiltable and rotatable in said casing and including a ball portion within said casing and a shank projecting freely through the opening in said casing, the effective center of rotation of the ball lying on the axis of said shank and on the axis of the eye in said one member, said shank having a portion coaxial with the remainder thereof and adapted to fit into and be secured in the eye of said second member, said second member being too large to fit through the eye on said one member, said cartridge unit being threadable into the eye in said one member and removable therefrom for replacement as a preassembled unit, said unit serving to connect said first and second members in tiltable and rotatable relation and coacting therewith to prevent dropping out or being pulled through the eye of said first member.

5. A preassemblable cartridge unit for connecting two rigid eye equipped members which comprises a hollow metal casing with an externally threaded side wall and an end portion having an internal surface converging from the internal surface of the side wall to a reduced size opening, a tool engaging head on the other end of the casing, said end portion of the casing fitting freely through an eye of one member, said head end of the casing being too large to fit through said eye and said threads on the side wall of the casing engaging said eye in threaded relation, and a stud assembly including an enlarged head portion disposed within and tiltable and rotatable with respect to said casing and including a shank projecting freely through the opening of the casing, said shank having a portion adapted to fit and be detachably secured in an eye of the other member, and said other member being too large to fit through said eye of said one member, whereby said unit connects the members in tiltable and rotatable relation and coacts therewith to prevent dropping out or being pulled through the eye of the first member.

6. The combination of claim 5 in which said internal surface converging to a reduced size opening is formed by a separate insert in said casing.

7. The combination of claim 5 further including means effective after said joint is threaded in said one member and engageable with said casing and said one member for locking said casing against rotation relative to said one member.

8. The combination of claim 5 further including a relatively soft bushing between said shank and said internal surface of said casing and operably engaging the latter, and a reinforcing sleeve element between said shank and bushing having a radial flange opposed to said enlarged head portion of said stud assembly and having one end to bearingly engage said internal surface of said casing and of a stronger material than the bushing and receiving and transmitting the axial thrust from said stud assembly to said bushing.

9. The combination of claim 5 in which said enlarged head portion of said stud assembly is of substantially the same curvature as said internal surface of said casing, and further including a bushing of relatively soft material between said shank and said internal surface and having a convex surface complemental to that of the latter and bodily rotatable and tiltable therein, means including a plate engageable with a portion of said stud assembly and resilient means acting against said plate for resiliently actuating said stud assembly toward said bearing surface, and a sleeve between said bushing and said shank adjacent said enlarged head portion and being of a material that is stronger than that of the bushing and transmitting axial thrust to said bushing and having a radially extending portion within said hollow casing of such size as to be normally free of engagement with said internal surface but sufficiently large to engage the latter after a predetermined short axial movement of said head portion to act as a stop to limit axial movement of the stud relative to the socket to but a short distance in one direction.

10. The combination of claim 5 further including a relatively soft bushing between said shank and said internal surface and having an exterior surface engageable with and movable with respect to said internal surface, and a reinforcing sleeve element disposed between said shank and said bushing and having an annular end surface complemental to said internal surface and adapted to engage said internal surface upon tilting of said stud assembly relative to said casing.

11. In combination with a pair of rigid eye equipped members, a preassemblable cartridge unit interconnecting said members and comprising a hollow metal casing and a stud assembly disposed within and movable with respect to said casing; said casing including a side wall threadedly engaging the eye of one of said members, an end wall connected to said side wall, an end portion having an internal surface converging from the internal surface of the side wall to a reduced-size opening, an enlarged head portion on the casing and larger in size than the eye in said one member, and a tool receiving portion to facilitate the threading of said casing into the eye of said one member; said stud assembly including a rigid shank projecting freely through the reduced-size opening in said end portion and insertable in the eye of the other one of said members while said end wall is connected to said side wall and while said cartridge unit is in an assembled state, and means for detachably securing said shank in said eye in said other member for ready connecting to and removal from said eye while said end wall is connected to said side wall and while said cartridge unit is in an assembled state.

12. The combination of claim 11 further including means including said enlarged head portion for preventing said casing from being forced from the eye of said one member.

13. The combination of claim 11 in which said hollow metal casing has a flattened portion and further including a washer surrounding a portion of said hollow metal casing and disposed between said one of said members and said enlarged head portion on the casing, projecting means on said washer engageable with a surface of said member lying in substantial parallelism with the axis of said cartridge unit for preventing rotation of said washer relative to said one member, and bendable means on said washer engageable with said flattened portion of said hollow metal casing for preventing relative rotation between said washer and said casing.

References Cited in the file of this patent

UNITED STATES PATENTS

| | | |
|---|---|---|
| 1,002,229 | Curtis | Sept. 5, 1911 |
| 1,642,640 | Bouch et al. | Sept. 13, 1927 |
| 1,796,142 | Crawford | Mar. 10, 1931 |
| 1,899,645 | Sneed | Feb. 28, 1933 |
| 2,147,815 | Hufferd et al. | Feb. 21, 1939 |
| 2,274,420 | Katcher | Feb. 24, 1942 |
| 2,388,950 | Booth | Nov. 13, 1945 |
| 2,488,979 | Kogstrom | Nov. 22, 1949 |
| 2,521,335 | Booth | Sept. 5, 1950 |
| 2,645,510 | Booth | July 14, 1953 |
| 2,809,855 | Booth | Oct. 15, 1957 |

FOREIGN PATENTS

| | | |
|---|---|---|
| 1,006,982 | France | Apr. 29, 1952 |
| 600,264 | Great Britain | Apr. 5, 1948 |

UNITED STATES PATENT OFFICE
CERTIFICATION OF CORRECTION

Patent No. 2,977,131                      March 28, 1961

Milton A. Moskovitz et al.

It is hereby certified that error appears in the above numbered patent requiring correction and that the said Letters Patent should read as corrected below.

Column 2, line 65, after "and" strike out "a"; column 3, line 48, for "rounder" read -- rounded --; column 5, line 45, after "relation," insert -- and --; column 6, line 28, for "eye on" read -- eye of --; column 8, line 4, for "connecting" read -- connection --.

Signed and sealed this 22nd day of August 1961.

(SEAL)
Attest:

ERNEST W. SWIDER
Attesting Officer

DAVID L. LADD
Commissioner of Patents